United States Patent
Itoga

(10) Patent No.: US 8,016,362 B2
(45) Date of Patent: Sep. 13, 2011

(54) OCCUPANT RESTRAINT APPARATUS

(75) Inventor: Yasuo Itoga, Tokyo (JP)

(73) Assignee: Takata Corporation, Tokyo (JP)

( * ) Notice: Subject to any disclaimer, the term of this patent is extended or adjusted under 35 U.S.C. 154(b) by 50 days.

(21) Appl. No.: 12/086,117

(22) PCT Filed: Oct. 27, 2006

(86) PCT No.: PCT/JP2006/321486
§ 371 (c)(1),
(2), (4) Date: Jun. 5, 2008

(87) PCT Pub. No.: WO2007/069397
PCT Pub. Date: Jun. 21, 2007

(65) Prior Publication Data
US 2009/0278394 A1 Nov. 12, 2009

(30) Foreign Application Priority Data
Dec. 16, 2005 (JP) .................. 2005-363691

(51) Int. Cl.
A62B 35/00 (2006.01)
A62B 35/04 (2006.01)
B60N 2/42 (2006.01)
B60R 21/18 (2006.01)
B60R 21/23 (2006.01)
B60R 22/00 (2006.01)

(52) U.S. Cl. ..... 297/471; 297/472; 297/482; 297/216.1; 280/733

(58) Field of Classification Search ............... 297/216.1, 297/482, 487, 471, 472; 280/733
See application file for complete search history.

(56) References Cited

U.S. PATENT DOCUMENTS

| | | | | |
|---|---|---|---|---|
| 3,820,842 A | * | 6/1974 | Stephenson | 280/733 |
| 3,933,370 A | * | 1/1976 | Abe et al. | 280/733 |
| 4,611,854 A | * | 9/1986 | Pfeiffer | 297/468 |
| 4,971,354 A | * | 11/1990 | Kim | 280/733 |
| 5,318,350 A | * | 6/1994 | Okamoto | 297/468 |
| 5,346,250 A | * | 9/1994 | Kamiyama | 280/733 |
| 5,466,003 A | * | 11/1995 | Tanaka et al. | 280/733 |
| 6,340,173 B1 | * | 1/2002 | Specht | 280/733 |
| 7,322,604 B2 | * | 1/2008 | Itoga et al. | 280/733 |
| 7,413,220 B2 | * | 8/2008 | Itoga et al. | 280/742 |
| 7,481,452 B2 | * | 1/2009 | Itoga et al. | 280/733 |
| 2005/0189749 A1 | * | 9/2005 | Itaoga et al. | 280/733 |

FOREIGN PATENT DOCUMENTS

| | | |
|---|---|---|
| JP | H11-165604 | 6/1999 |
| JP | H11-170949 | 6/1999 |
| JP | H11-170950 | 6/1999 |
| JP | H11-268608 | 10/1999 |
| JP | H11-268609 | 10/1999 |
| JP | H11-334528 | 12/1999 |

(Continued)

Primary Examiner — Rodney B White
Assistant Examiner — Joseph Edell
(74) Attorney, Agent, or Firm — Manabu Kanesaka

(57) ABSTRACT

An occupant restraint apparatus includes an anchor adapted to be fixed to a vehicle body, a lap belt having a tip side fixed to the anchor, and an inflatable portion formed at the tip side, an inflator for introducing gas from the tip side to inflate the inflatable portion, and a cover. The cover includes a first masking portion for covering the anchor, and a second masking portion formed separately from the first masking portion and attached to the first masking portion for covering at least the tip side of the lap belt.

14 Claims, 12 Drawing Sheets

FOREIGN PATENT DOCUMENTS

| | | |
|---|---|---|
| JP | 2002-145002 | 5/2002 |
| JP | 2003-312439 | 11/2003 |
| JP | 2004-351948 | 12/2004 |
| JP | 2005-231504 | 9/2005 |
| JP | 2005-238861 | 9/2005 |
| WO | WO 97/47498 | 12/1997 |
| WO | WO 01/36235 | 5/2001 |

* cited by examiner

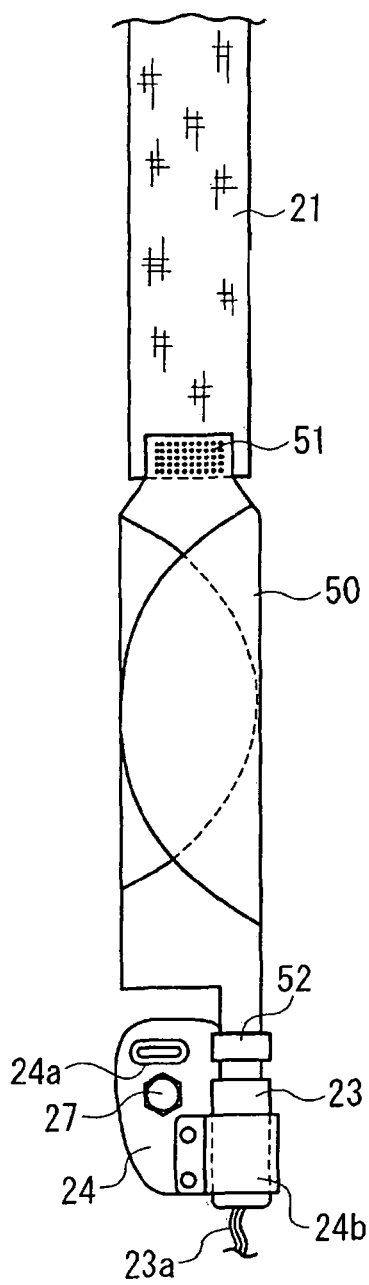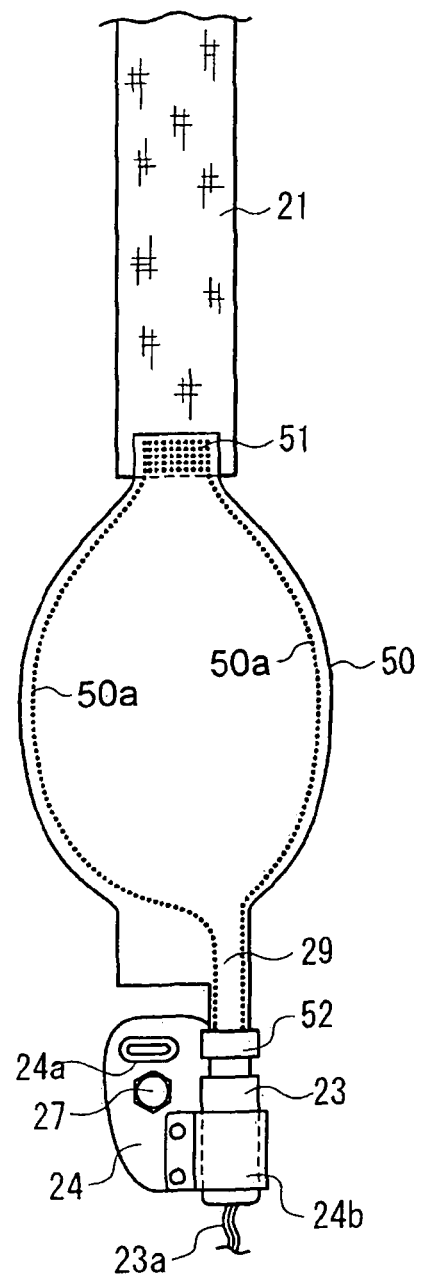

OCCUPANT RESTRAINT APPARATUS

TECHNICAL FIELD

The present invention relates to an occupant restraint apparatus provided with a lap belt having an inflatable portion, which is inflated in the event of a vehicle collision or the like.

BACKGROUND ART

In FIG. 2 of WO 01/036235 (PCT Japanese Translation Patent Publication No. 2003-525797), a structure is described that has a retractor mounted on the floor of a vehicle and allows the tip side of an inflatable lap belt to be retracted by the retractor. In this prior example, an inflator is mounted on the vehicle floor and gas is introduced into the lap belt through a special structure, so called a plenum.

[Patent Document 1] PCT Japanese Translation Patent Publication No. 2003-525797

In the PCT Japanese Translation Patent Publication No. 2003-525797, as shown in FIG. 2 thereof, an inflator and a gas supply tube connecting the inflator to a plenum (the tip side of a lap belt) are exposed in a vehicle cabin. There is therefore a risk that the inflator is directly sprayed with water or covered with dust, or that the inflator and/or the gas supply tube are damaged due to rubbing or the like. Furthermore, the appearance of the interior of the vehicle cabin is defiled.

SUMMARY OF THE INVENTION

An object of the present invention is to provide an occupant restraint apparatus that provides good protection characteristics for the tip side of a lap belt and an inflator, the occupant restraint apparatus having a lap belt inflatable portion into which gas of the inflator is introduced from the tip side of the lap belt.

An occupant restraint apparatus of the present invention is characterized in being provided with a cover for covering at least the tip side of a lap belt and an inflator, the occupant restraint apparatus including the lap belt having an inflatable portion, into which gas is introduced from the tip side of the lap belt, and the inflator for inflating the inflatable portion.

The cover may be configured so as to be opened by being torn when the inflatable portion is inflated.

The tip side of the lap belt may be attached to an anchor attachment portion of a vehicle body via an anchor.

The tip side of the lap belt may be attached to an anchor attachment portion of a seat via an anchor.

The inflator may be fixed to the anchor.

The cover may also cover the anchor.

The cover may include a first masking portion, which covers at least the inflator, and a second masking portion, which covers at least the tip side of the lap belt, the second masking portion being pivotable in a fore-and-aft direction with respect to the first masking portion.

The cover may be configured so as to hold the tip side of the lap belt in an attitude of being extended substantially upward in a state when the lap belt is not routed to the side of an occupant.

The cover may be made of plastic.

BRIEF DESCRIPTION OF DRAWINGS

FIG. 6a shows when the lap belt is not inflated and FIG. 6b shows when it is inflated.

FIGS. 8a and 8b are drawings for explaining the inner structure of the lap bag.

DETAILED DESCRIPTION

Figure 1:
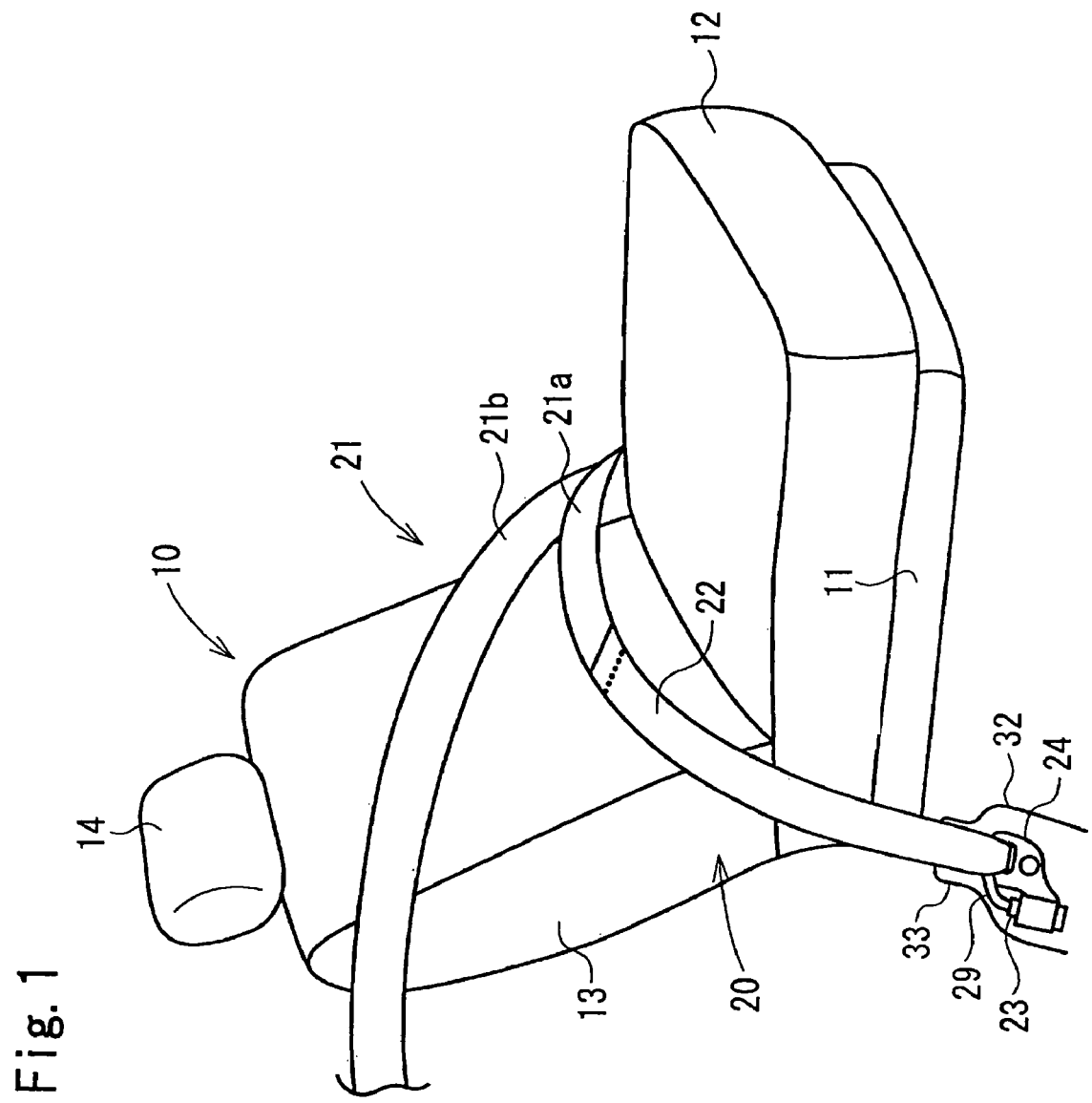
FIG. 1 is a perspective view of a vehicle seat equipped with an occupant restraint apparatus according to an embodiment of the present invention.

In an occupant restraint apparatus of the present invention, gas from an inflator is introduced from the tip side of a lap belt into an inflatable portion of the lap belt. In the present invention, since the tip side of the lap belt and the inflator are covered by a cover, it is prevented or suppressed that the inflator is directly sprayed with water or covered with dust, or that the inflator and/or the tip side of the lap belt are damaged due to rubbing or the like, so good protection characteristics for the tip side of the lap belt and the inflator (that is, the whole of gas supply members from the inflator to the inflatable portion of the lap belt) are therefore ensured.

In addition, since the tip side of the lap belt and the inflator are not exposed in a vehicle cabin, the appearance of the interior of the vehicle cabin is good.

Incidentally, in the occupant restraint apparatus of the present invention, when, for example, a sensor installed in a vehicle for detecting or predicting a collision detects or predicts a collision of the vehicle (a side collision is included in the present invention, and a lateral overturn may also be included), the inflator is activated based on a collision detection signal or a collision prediction signal from the sensor and ejects gas; the gas from the inflator is introduced into the inflatable portion and thereby the inflatable portion is inflated. As a result of this, an occupant is restrained to a seat, and at the same time an impact applied to the occupant is absorbed by the inflated inflatable portion.

The cover may be configured so as to be opened by being torn when the inflatable portion is inflated; thereby the inflatable portion can be satisfactorily inflated.

In the present invention, the tip side of the lap belt (and the inflator) may be attached to the vehicle body (for example, a B-pillar or a floor portion of the vehicle cabin) or to a seat (for example, a seat frame). In this case, the attachment of the tip side of the lap belt to the vehicle body or the seat can be simplified by attaching via an anchor.

The attachment of the inflator to the vehicle body or the seat can also be simplified by fixing the inflator to the anchor.

In the case when the tip side of the lap belt (together with the inflator) is attached via the anchor, as with claim 6, the cover may be configured to cover the anchor as well; thereby the anchor is not exposed in the vehicle cabin and the appearance of the interior of the vehicle cabin is made favorable.

If the cover is constituted of a first masking portion, which covers at least the inflator, and a second masking portion, which covers at least the tip side of the lap belt, the second masking portion being pivotable in a fore-and-aft direction with respect to the first masking portion, when the tip side of the lap belt pivots forward or backward, the second masking portion pivots forward or backward in accordance therewith. It is therefore prevented or suppressed that strained twist and/or rubbing will occur on the tip side of the lap belt and the cover. As a result, strength, abrasion resistance, and the like required for the lap belt and the cover are relaxed.

The cover may be configured so as to hold the tip side of the lap belt in an attitude of being extended substantially upward when the lap belt is not routed to the side of the occupant; thereby it becomes possible that the tip side of the lap belt is prevented from hanging out of the vehicle at the opening and closing of a door and from being pinched by the door.

The cover may be made of plastic or any other material (for example, metal, wood, leather, cloth, rubber, or the like).

An embodiment of the present invention will now be described with reference to the attached drawings.

Figure 2:
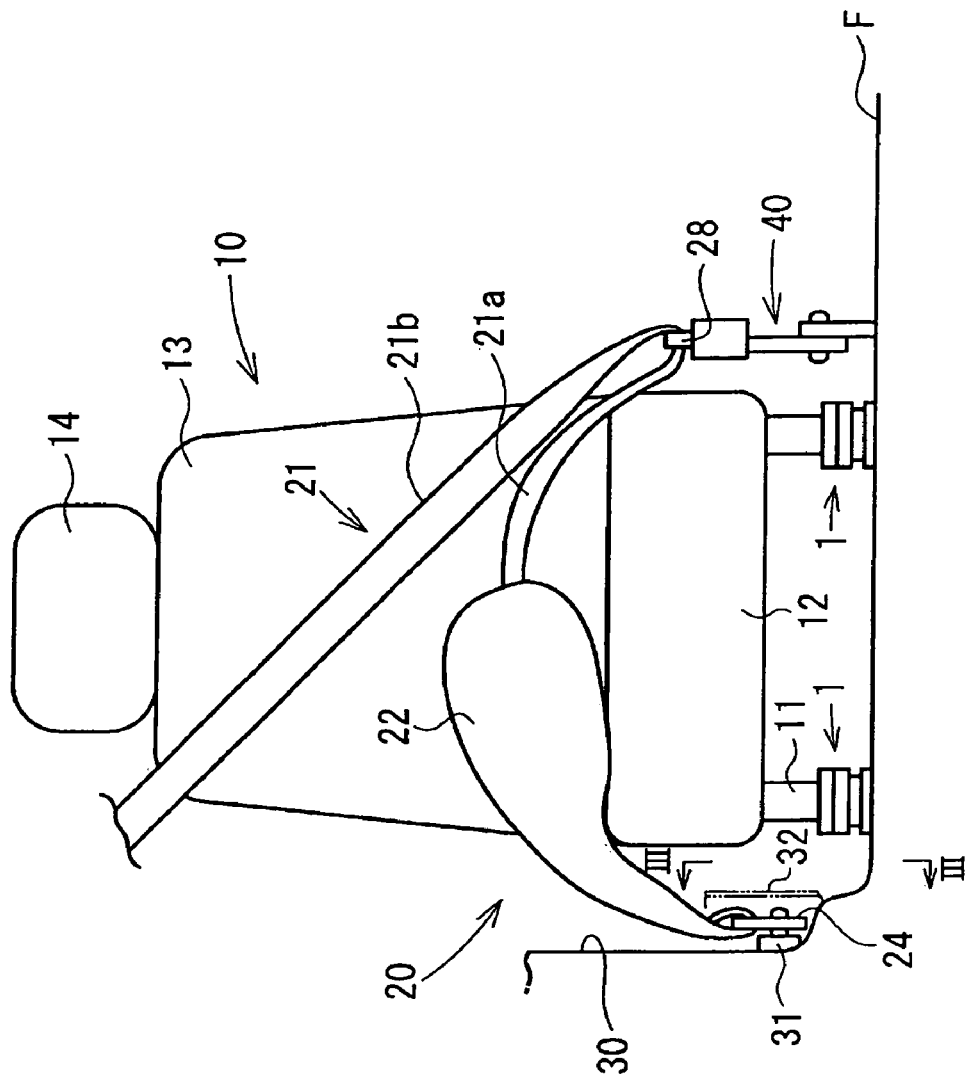
FIG. 2 is an elevation view of the vehicle seat of FIG. 1.
Figure 3:
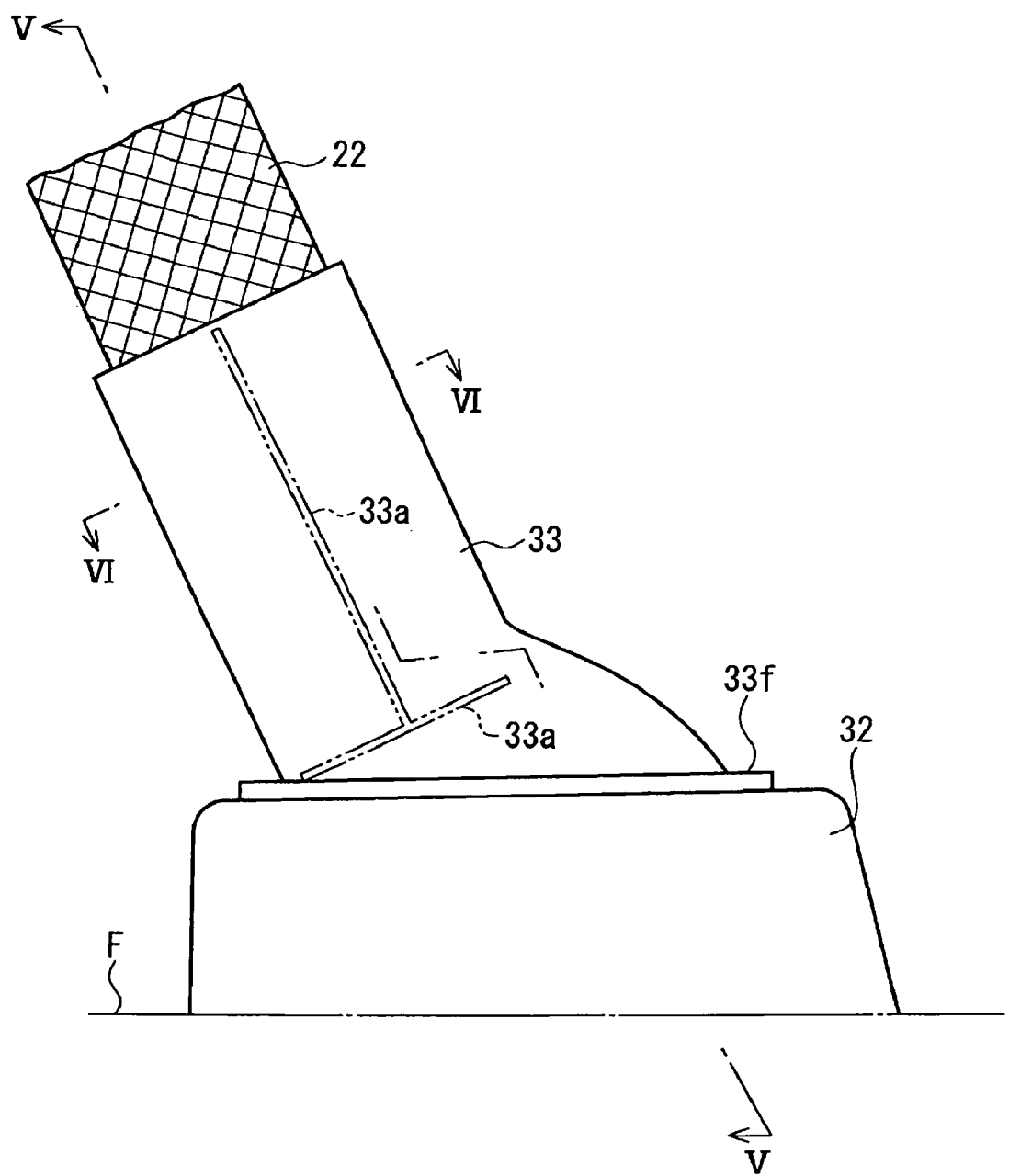
FIG. 3 is a view along arrows III-III of FIG. 2 when the lap bag is not inflated.
Figure 4:
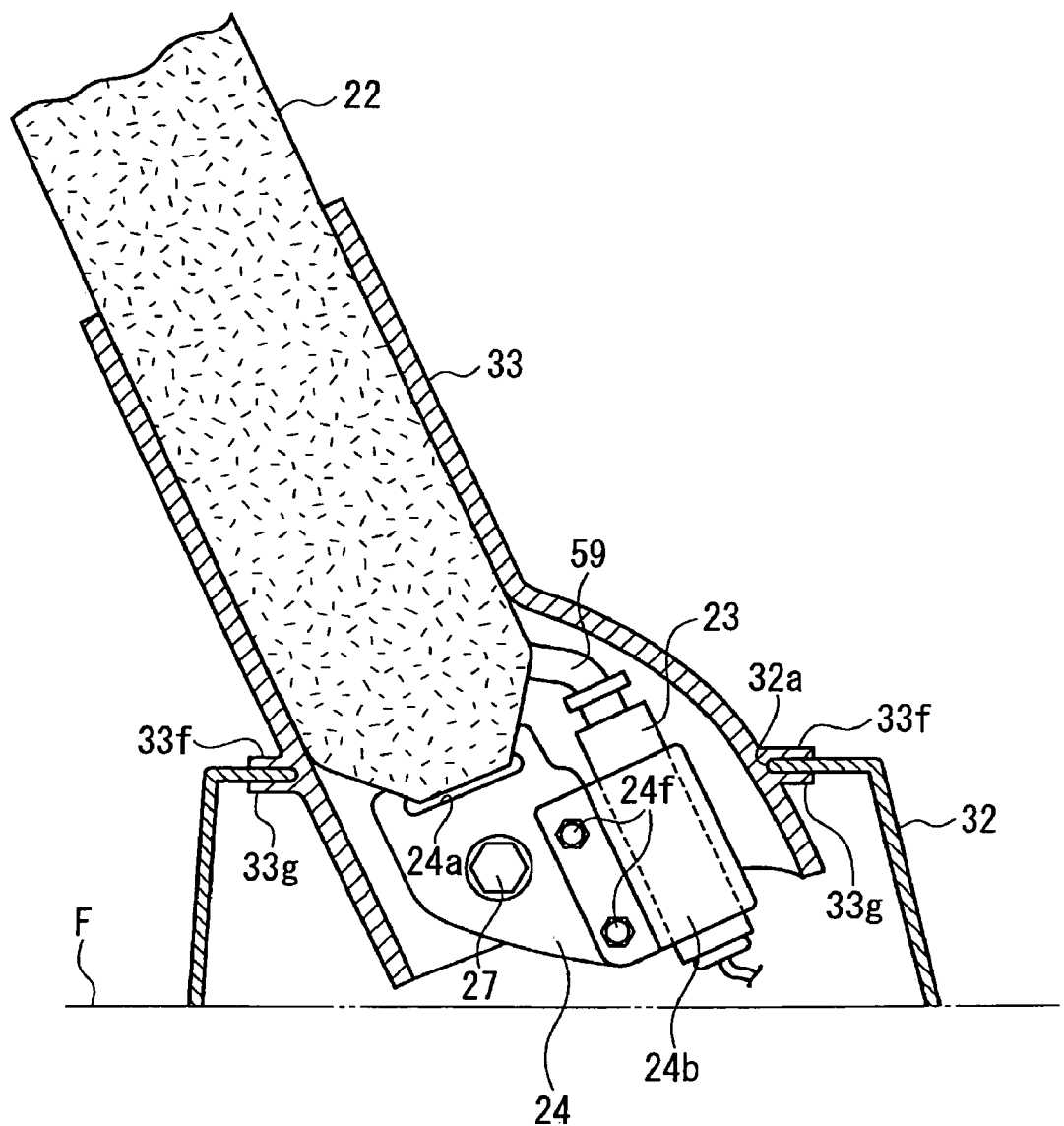
FIG. 4 is a cross-section view taken along lines IV-IV of FIG. 5.
Figure 5:
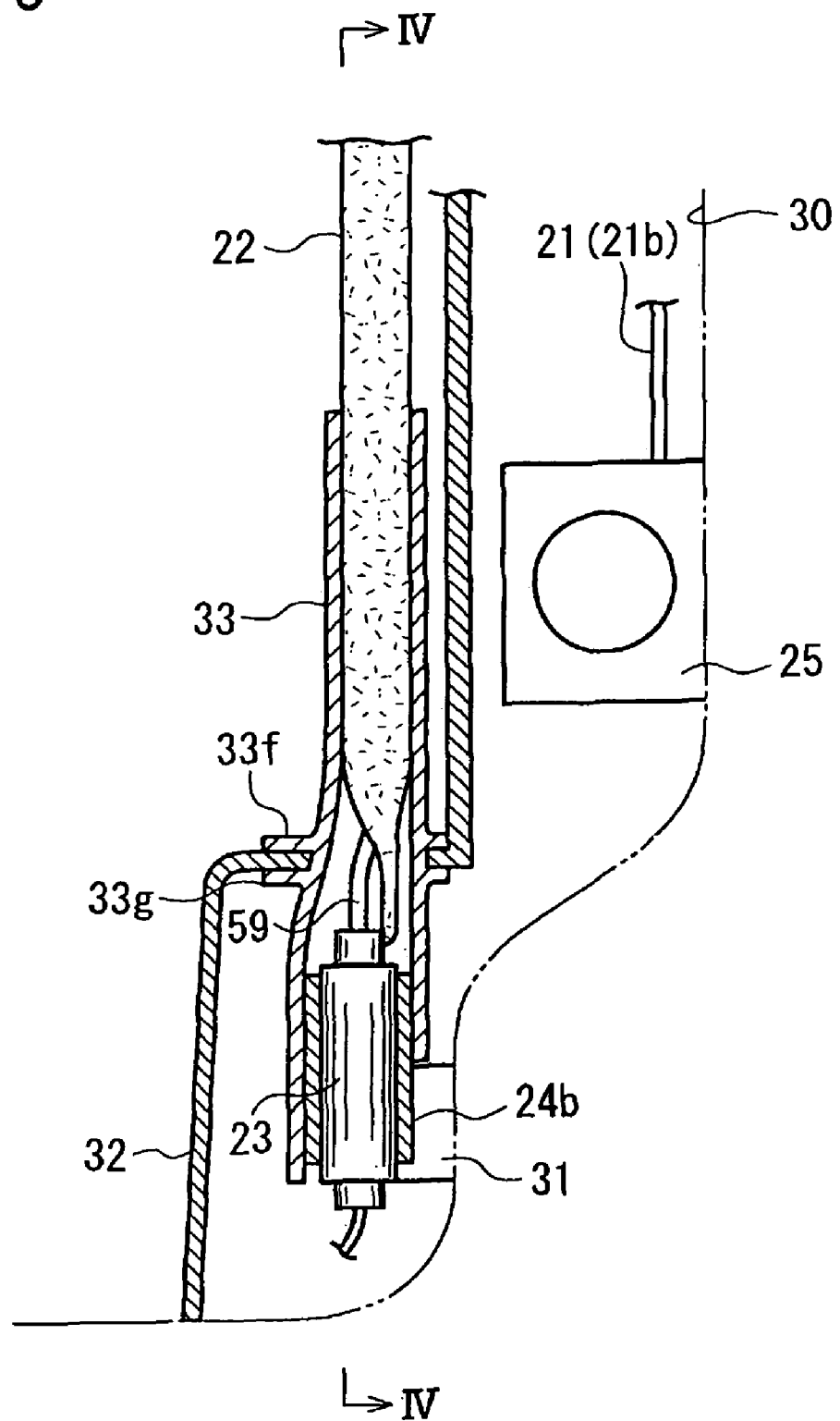
FIG. 5 is a cross-section view taken along lines V-V of FIG. 3.
Figure 6A:
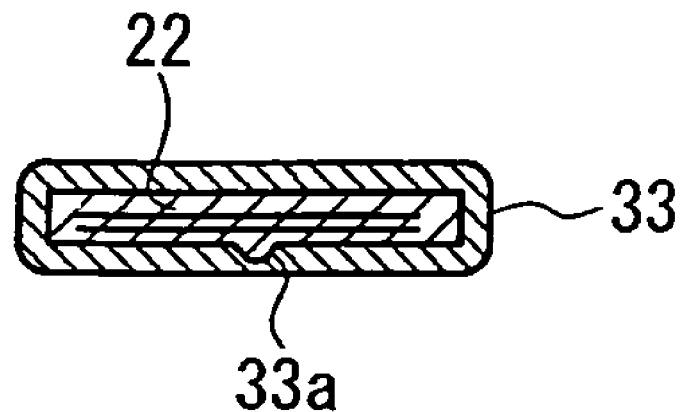
FIGS. 6a and 6b are cross-section views taken along lines VI-VI of FIG. 3.
Figure 6B:
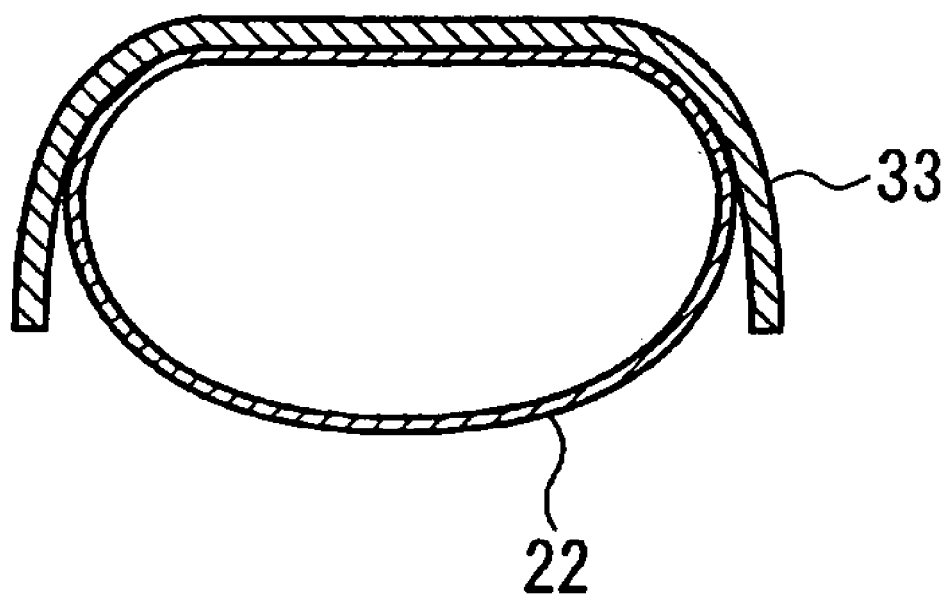
Figure 7:
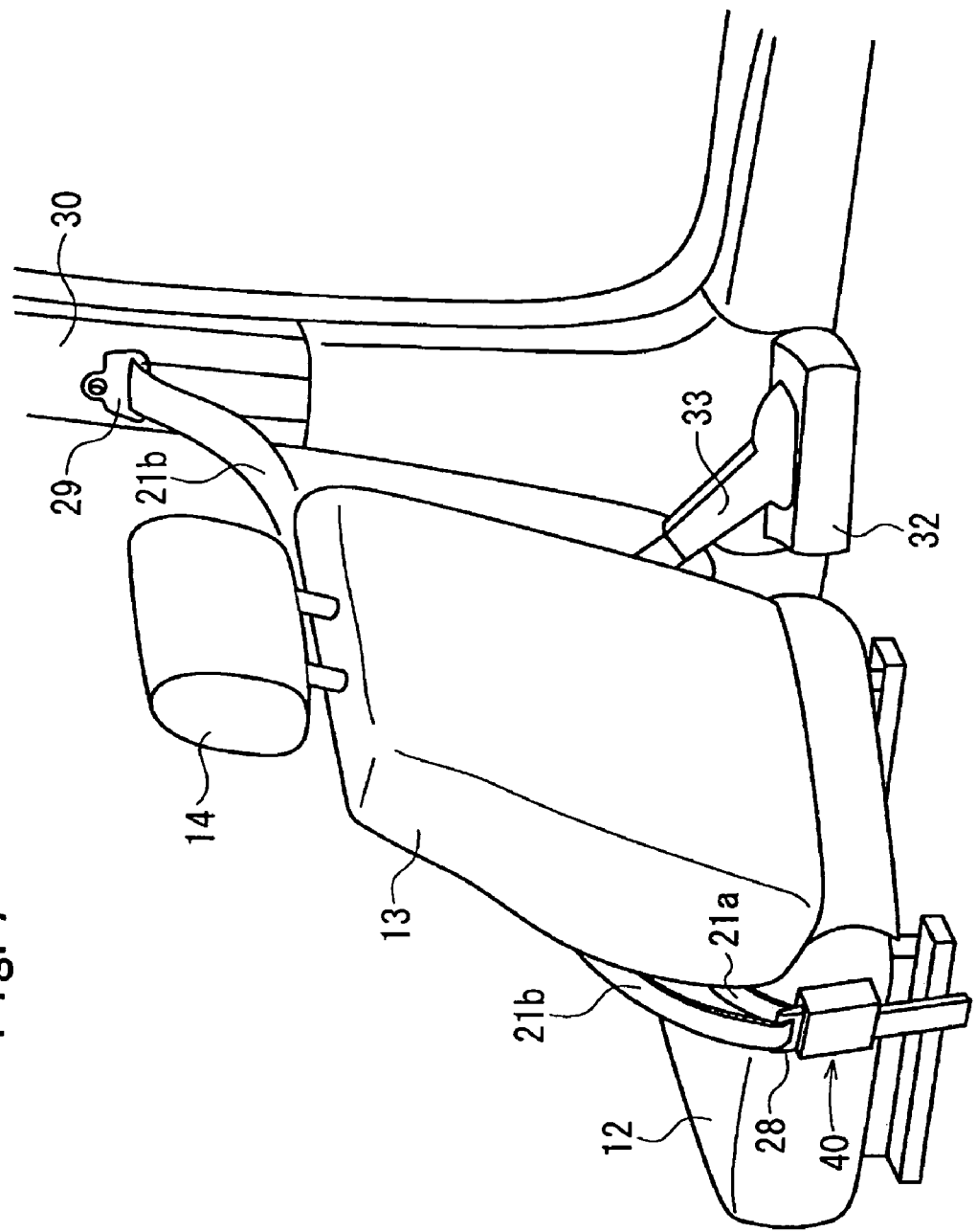
FIG. 7 is a perspective view, seen from behind, of the vicinity of the vehicle seat of FIG. 1.

FIG. 1 and FIG. 2 are a perspective view and an elevation view, respectively, of a vehicle seat equipped with an occupant restraint apparatus according to an embodiment of the present invention, FIG. 3 is a view along arrows III-III of FIG. 2, FIG. 4 is a cross-section view taken along lines IV-IV of FIG. 5, FIG. 5 and FIGS. 6a and 6b are cross-section views taken along lines V-V and lines VI-VI, respectively, of FIG. 3, FIG. 7 is a perspective view, seen from behind, of the vicinity of the vehicle seat, and FIGS. 8a and 8b are drawings for explaining the inner structure of the lap bag. Note that FIG. 2 and FIG. 6b show when the lap bag of the air belt is inflated, while the others show a state of the lap belt before being inflated. FIG. 8a shows the bag body of the lap bag in a state of being folded into a belt-like shape, and FIG. 8b shows the bag body in a state of being flatly spread out.

On a vehicle cabin floor surface F, a pair of seat rails 1 are provided to extend in a direction parallel to a vehicle fore-and-aft direction and a vehicle seat 10 is mounted thereon so as to be movable in the vehicle fore-and-aft direction.

The seat 10 consists of a seat frame 11, a seat cushion 12 placed on the seat frame 11, a seat back 13 set up at the rear end of the seat cushion 12 to be reclinable, and a head rest 14 installed above the seat back 13.

The occupant restraint apparatus 20 includes a webbing 21 routed on the front side of an occupant seated on the seat 10, an inflatable lap bag 22 constituting a tip side portion of a lap belt portion 21a (to be described later) of the webbing 21, an inflator 23 for inflating the lap bag 22, an anchor 24 for attaching the tip side of the lap bag 22 to the vehicle body, and a retractor 25 (FIG. 5) for retracting the rear end side of the webbing 21.

The webbing is composed of a normal belt material of a noninflatable type. The rear end side of the webbing 21 is connected to the seat belt retractor 25 so as to be retracted thereon after being hung through a shoulder anchor 29 provided on a side upper portion of the vehicle cabin. Furthermore, a midpoint of the webbing 21 is hung through a tong 28 (FIG. 2).

One portion of the webbing 21 on the side of the anchor 24 with respect to the tong 28 constitutes the lap belt portion 21a, which is routed along the front of the waist or the belly of the occupant seated on the seat 10, and the other portion on the side of the shoulder anchor 29 with respect to the tong 28 constitutes a shoulder belt portion 21b, which is routed along the front of the upper body of the occupant.

The rear end (upper end in FIGS. 3 to 5) side of the lap bag 22 is connected to the tip end of the webbing 21 of the lap belt portion 21a by sewing or the like.

The tip end of the lap bag 22 is inserted through an opening 24a of the anchor 24 as shown in FIG. 4 and is sewn to the base end side of the lap bag 22; thereby the lap bag 22 is connected to the anchor 24.

It should be noted that the lap bag 22 includes the bag body 50, a mesh webbing (not shown) enclosing the bag body 50, and a protection cover (not shown) covering substantially the entire of the mesh webbing and the tip side of the webbing 21.

The bag body 50 is a bag-like member fabricated by sewing a plurality of superposed base clothes together at seams 50a in the circumferential area thereof. The rear end of the bag body 50 is attached to the tip end of the webbing 21 by sewing them together at a seam 51. As shown in FIG. 8b, the maximum width of the base clothes is larger than the width of the webbing 21. Both sides of the bag body 50 in its width direction are folded to be a belt-like form having substantially the same width as the webbing 21 as shown in FIG. 8b. A gas introduction duct 59 is provided to extend from a portion of the bag body 50, the portion being on the tip side of the lap belt portion 21a.

The mesh webbing described above covers the bag body 50 folded into a belt-like shape. The mesh webbing is composed of a knit member that is hardly stretched in a longitudinal direction, but is flexibly stretchable in a widening or expanding direction.

The rear end side of the mesh webbing is sewn to the vicinity of the tip of the webbing 21. And, the top end side of the mesh webbing is folded back by being inserted through the opening 24a of the anchor 24 and is sewn to an area on the rear end side thereof; thereby the mesh webbing is connected to the anchor 24.

The protection cover described above is a tubular member fabricated by folding a sheet-like material having a slim rectangular shape and by sewing at a tear seam (not shown). The tear seam is of such strength that it is broken when the bag body 50 is inflated.

The protection cover extends from a top end portion of the webbing 21 to a position immediately close to the anchor 24. The rear end side of the protection cover covers a portion where the webbing 21 and the mesh webbing are sewn together, and this rear end side is sewn to the webbing 21 by the tear seam. The tip side of the protection cover covers the sewn portion on the top end side of the mesh webbing, but is slightly apart from the anchor. The top end side of the protection cover is sewn to the mesh webbing by the tear seam. The tear seams on both the rear and top end sides are also of such strength that they are broken when the bag body 50 is inflated.

In this embodiment, an inflator holding portion 24b is attached to the anchor 24 by a pair of bolts 24f, so the inflator 23 is supported by the anchor 24 in a state of being enfolded by the inflator holding portion 24b.

The gas introduction duct 59 described above is connected to the inflator 23. The duct 59 is connected to the inflator 23, in this embodiment, by being put over a gas blow-out port of the inflator 23 and by being tightened from its outer circumference with a band 52 (FIGS. 8a and 8b). Through this duct 59, gas is introduced from the inflator 23 into the bag body 50 of the lap bag 22.

Incidentally, a harness 23a (FIGS. 8a and 8b) for passing a current to an initiator (not shown) of the inflator 23 is connected to an inflator control circuit (not shown), and when the initiator is activated based on an activation signal from the inflator control circuit, the inflator blows out the gas.

As shown in FIGS. 4 to 6b, the anchor 24 is attached to a base portion 31 via an attachment bolt 27, the base portion 31 being an anchor attachment portion in a lower portion of a B-pillar 30. These anchor 24, inflator 23 and lower portion of the B-pillar 30 are covered by a B-pillar cover 32. In addition, a lower portion of the lap bag 22 extending upward from the B-pillar cover 32 is enfolded by a belt cover 33.

That is, in this embodiment, the B-pillar cover 32 and the belt cover 33 constitutes a cover that covers the whole of a lower end portion of the lap bag 22, the inflator 23 and the anchor 24. In this embodiment, however, the belt cover 33 that is a second masking portion is not pivotable with respect to the B-pillar cover 32 that is a first masking portion.

As shown in FIG. 5, a lower portion of the B-pillar cover 32 is bulged toward an interior of the vehicle cabin, and an opening 32a is provided in the top face thereof. The lap bag 22 is inserted through this opening 32a. A lower portion of the belt cover 33 is fit in the opening 32a. Flanges 33f and 33g are provided on the outer surface of the lower portion of the belt cover 33, and the peripheral portion of the opening 32a is interposed between the flanges 33f and 33g.

In this embodiment, the B-pillar cover 32 and the belt cover 33 are both made of plastic. Specifically, the belt cover 33 is of a flexible member (the member being elastically deformable) as described below.

That is, in this embodiment, in a state of being not belted, i.e., when the lap bag 22 is not routed to the side of the occupant, the belt cover 33 takes a posture standing (self sustaining) substantially upward from the B-pillar cover 32, as shown in the attached figure. Therefore, the lap bag 22 also takes a posture standing substantially upward as being assisted by the belt cover 33 to keep its shape. The belt cover 33 is configured so as to be elastically deformable in accordance with the pivot of the lap bag 22 when the lap bag 22 is routed to the side of the occupant (namely, in a state of being belted).

However, the material of the belt cover 33 (and the B-pillar cover 32) is not limited to plastic, but a variety of materials including metal, wood, leather, cloth, rubber, or the like can be employed for fabricate thereof.

As shown in FIGS. 3, 6a and 6b, the belt cover 33 is provided with a tear line 33a, and is opened by being torn along the tear line 33a, as shown in FIGS. 6a and 6b, when the lap bag 22 is inflated.

As shown in FIG. 2, on the cabin center side of the seat 10, there is installed a buckle device 40, by which the tong 28 described above is latched. This buckle device 40 may be attached to the seat 10 or mounted on the vehicle cabin floor surface F.

Although not shown, a vehicle equipped with this occupant restraint apparatus 20 is provided with various types of sensors, which detect that the vehicle has been involved in a collision (including a side collision, hereinafter the same) or lateral overturn, or predict a collision or lateral overturn of the vehicle (both of the detecting sensor and predicting sensor may be provided). The inflator control circuit described above activates the initiator of the inflator 23 based on a detection signal or a prediction signal from these sensors.

In the occupant restraint apparatus 20 thus configured, since the inflator 23 and the lower end side of the lap bag 22 (the whole of gas supply members from the inflator 23 to the lap bag 22 through the gas introduction duct 59) are covered by the covers 32 and 33, it is prevented or suppressed that the inflator 23 is directly sprayed with water or covered with dust, or that the gas supply members such as the inflator 23, the duct 59, the lower end side of the lap bag 22, and the like are damaged due to rubbing or the like, so good protection characteristics for these gas supply members are therefore ensured.

In addition, since these gas supply members, and also the anchor 24 in the case of this embodiment, are not exposed in the vehicle cabin, the appearance of the interior of the vehicle cabin is good.

In this embodiment, the tip side of the lap bag 22 is attached to the B-pillar 30, which is a vehicle body side member, via the anchor 24, and thereby the attachment of the lap belt to the vehicle body is easy and low cost.

Since the inflator 23 is integrated into the anchor 24 in this embodiment, the attachment of the inflator 23 is easy and results in low cost.

In this embodiment, in a state that the lap bag 22 is not routed to the side of the occupant, the lap bag 22 takes a posture standing substantially upward as being assisted by the cover 33 to keep the shape, so it can be prevented, for example, that the lap bag 22 hangs out of the vehicle at the opening and closing of a door and is pinched by the door.

Next, how the occupant restraint apparatus is activated will be described below.

In the case when it is detected or predicted by the sensors that the vehicle has been involved in a collision or lateral overturn, an activation signal is input from the inflator control circuit to the initiator of the inflator 23 based on the detection signal or the prediction signal, and thereby the initiator is activated, which causes gas to be blown out from the inflator 23. Because the gas from the inflator 23 is introduced into the lap bag 22 (inside the bag body 50 described above), the lap bag 22 (bag body 50) is inflated while the belt cover 33 and the protection cover (not shown) are torn and opened.

At that time, according to the expansion of the bag body 50 of the lap bag 22, the mesh webbing enclosing the bag body 50 also expands. However, since the mesh webbing is composed of the knit member which is hardly stretched in a longitudinal direction, but is flexibly stretchable in a widening or expanding direction, as the mesh webbing expands, the length thereof becomes short. As a result, tension is applied to the webbing 21, which causes the lap belt 21a (including the lap bag 22) to have an intimate contact with the body of the occupant and the occupant to be restrained in the seat 10, and at the same time an impact applied to the waist or the belly of the occupant is absorbed by the inflated lap bag 22.

Figure 9A:
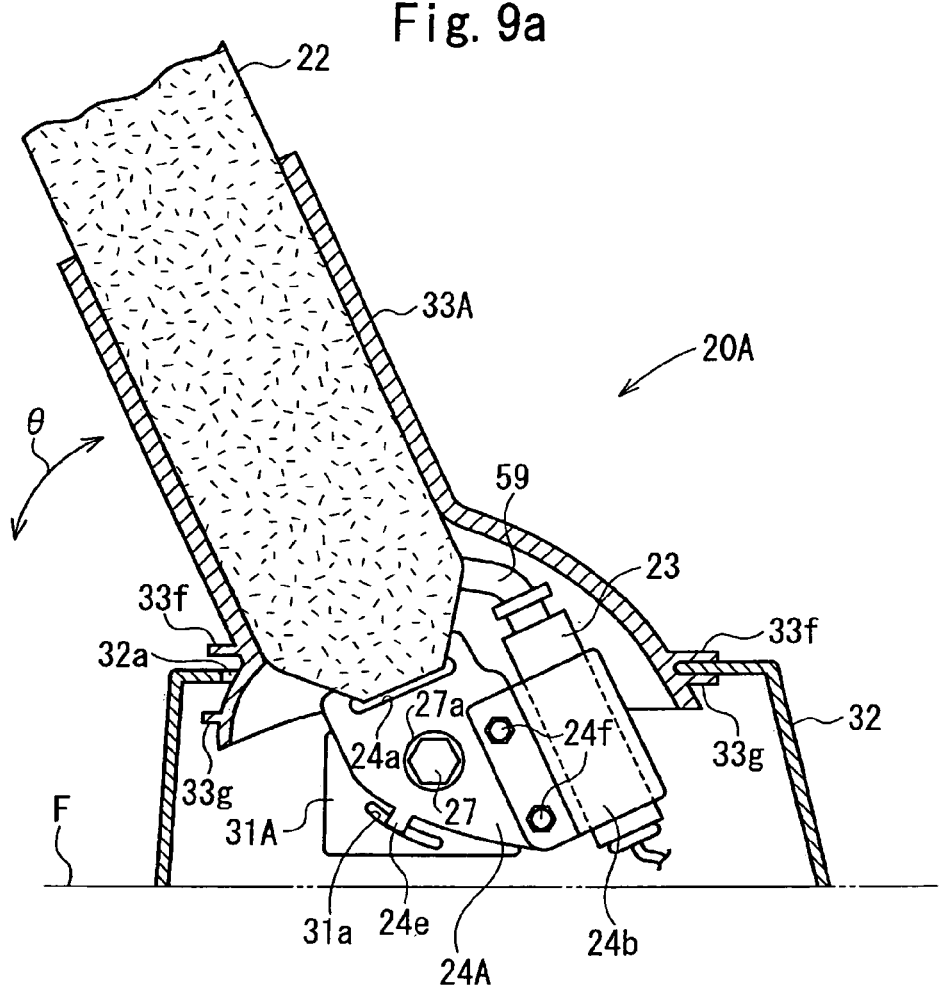
FIG. 9a is a vertical cross-section view in the vehicle fore-and-aft direction of an occupant restraint apparatus according to another embodiment.
Figure 9B:
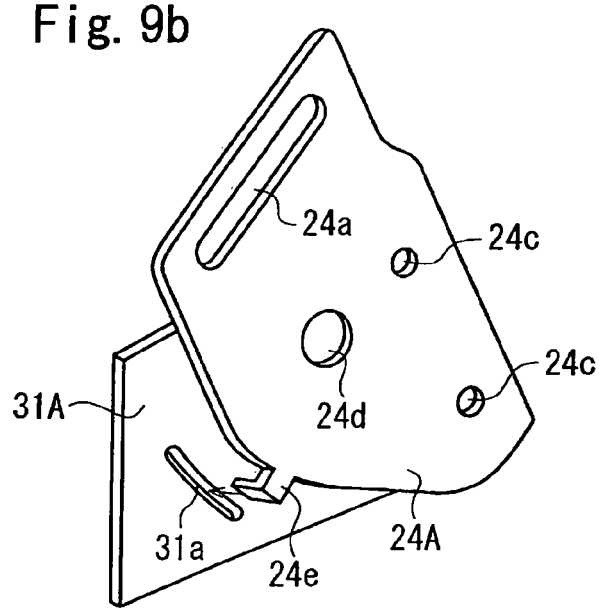
FIG. 9b is a perspective view of a portion of this apparatus.
Figure 10:
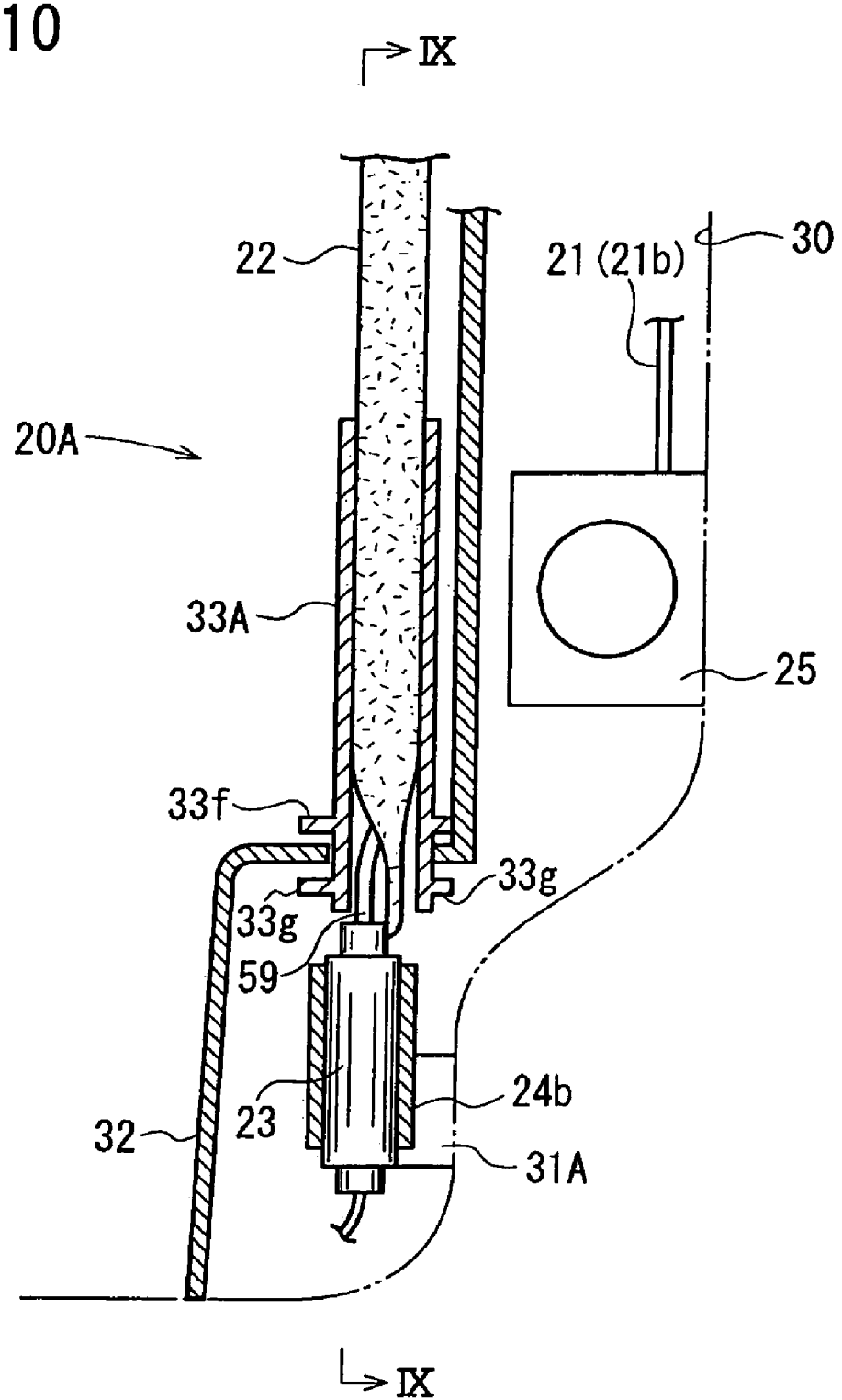
FIG. 10 is a vertical cross-section view in the vehicle widthwise direction of the occupant restraint apparatus of FIGS. 9a and 9b.

FIG. 9a is a vertical cross-section view in the vehicle fore-and-aft direction of an occupant restraint apparatus according to another embodiment (a cross-section view taken along lines IX-IX of FIG. 10), FIG. 9b is a perspective view of a portion of FIG. 9a, and FIG. 10 is a vertical cross-section view in the vehicle widthwise direction of this occupant restraint apparatus.

In an occupant restraint apparatus 20A according to this embodiment, an anchor 24A connecting the tip side of a lap bag 22 to a B-pillar 30 is installed so as to be pivotable with respect to the B-pillar 30 (a base portion 31A, described later), and a belt cover 33A, which is a second masking portion for covering this lap bag 22, is connected to a B-pillar cover 32, which is a first masking portion for covering an inflator 23 and the anchor 24A, also so as to be pivotable. The configuration of the anchor 24A and the belt cover 33A will be described below.

Also in this embodiment, an inflator holding portion 24b is attached to the anchor 24A by a pair of bolts 24f and the inflator 23 is supported by the anchor 24A in a state of being enfolded by the inflator holding portion 24b. This anchor 24A is attached to the base portion 31A, which is an anchor attachment portion in a lower portion of the B-pillar 30, via an attachment bolt 27 so as to be pivotable. Although not shown in the embodiment described above, as shown in FIG. 9b, the anchor 24A is provided with a pair of holes 24c for inserting through the bolts 24f and a hole 24d for inserting through the attachment bolt 27, besides an opening 24a for passing through the lap bag 22.

In this embodiment, there is provided a nail-like lug portion 24e bent upward from a peripheral portion of the anchor 24A. In the base portion 31A, there is provided a slot 31a into which this lug portion 24e is inserted, besides a female threaded hole in which the attachment bolt 27 is screwed. The slot 31a is a slot extending in an arc shape so as to have an equal radius with respect to the center of the female thread hole for the attachment bolt 27. The lug portion 24e is movable in the slot 31a from one end side to the other end side thereof.

Furthermore, a slip washer 27a (FIG. 9a) is interposed between the head portion of the attachment bolt 27 and the anchor 24A. Another slip washer (not shown) is also interposed between the anchor 24A and the base portion 31A, and thereby the anchor 24A is attached so as to be pivotable with respect to the base portion 31A. The anchor 24A is pivotable within the range in which the lug portion 24e is movable in the slot 31a.

Also in this embodiment, the anchor 24A, the inflator 23 and a lower portion of the B-pillar 30 are covered by the B-pillar cover 32. Moreover, a lower portion of the lap bag 22 extended upward from the B-pillar cover 32 is enfolded by the belt cover 33A.

Similarly as with the embodiment described above, a lower portion of the B-pillar cover 32 is bulged toward an interior of the vehicle cabin, and an opening 32a is provided in the top face thereof, as shown in FIG. 10. The lap bag 22 is inserted through this opening 32a. A lower portion of the belt cover 33A is fit in the opening 32a. Flanges 33f and 33g are provided on the outer surface of the lower portion of the belt cover 33A, and the peripheral portion of the opening 32a is disposed between the flanges 33f and 33g.

In this embodiment, at the rear side of the belt cover 33A, the peripheral portion of the opening 32a is interposed between the flanges 33f and 33g. The space between the flanges 33f and 33g becomes larger as being close to the front side of the belt cover 33A; thereby the belt cover 33A can be pivoted in a fore-and-aft direction together with the anchor 24A and the lap bag 22 in one piece.

Also in this embodiment, the belt cover 33A is provided with a tear line 33a, and is opened by being torn along the tear line 33a when the lap bag 22 is inflated.

The other configuration of the occupant restraint apparatus 20A is the same as the occupant restraint apparatus 20 shown above in FIGS. 1 to 8b, and identical elements in FIGS. 9 and 10 with those shown in FIGS. 1 to 8b are indicated by identical reference characters. And, the activation (control mechanism) of the occupant restraint apparatus 20A is also similar to that of the occupant restraint apparatus 20.

Also in this embodiment, since the whole of gas supply members from the inflator 23 to the tip side of the lap bag 22 via a duct 59 are covered by the covers 32 and 33A, good protection characteristics for these gas supply members are therefore ensured. In addition, since these gas supply members and also the anchor 24 are not exposed in the vehicle cabin, the appearance of the interior of the vehicle cabin is good.

Furthermore, in this embodiment, when the tip side of the lap bag 22 is pivoted in a vehicle fore-and-aft direction due to fore-and-aft shifting of the seat, forward leaning of the occupant, or the like, the anchor 24A and the belt cover 33A are also pivoted in the direction of arrow θ of FIG. 9a in accordance therewith. Twisting, rubbing, or the like arising in a top end portion, specifically at a portion close to the opening 24a are thereby lessened. As a result, strength, abrasion resistance, and the like required for the lap bag 22 are relaxed.

Each of the embodiments described above indicates an example of the present invention, and the present invention is not limited to the embodiments described above.

In the embodiment shown in FIGS. 9a to 10, for example, the lug portion 24e may be provided on the base portion 31A and the slot 31a may be provided in the anchor 24A. Alternatively, the pivoting range of the anchor 24A may be restricted in a manner such that, instead of the slot 31a, lugs are provided at positions near both ends of the slot 31a and a lug portion 24e is allowed to be movable between the lugs.

Although the anchor 24 or 24A is mounted to a lower portion of the B-pillar 30 in the embodiments described above, it may be mounted to a seat frame 11 or on a vehicle cabin floor surface F.

Figure 11:
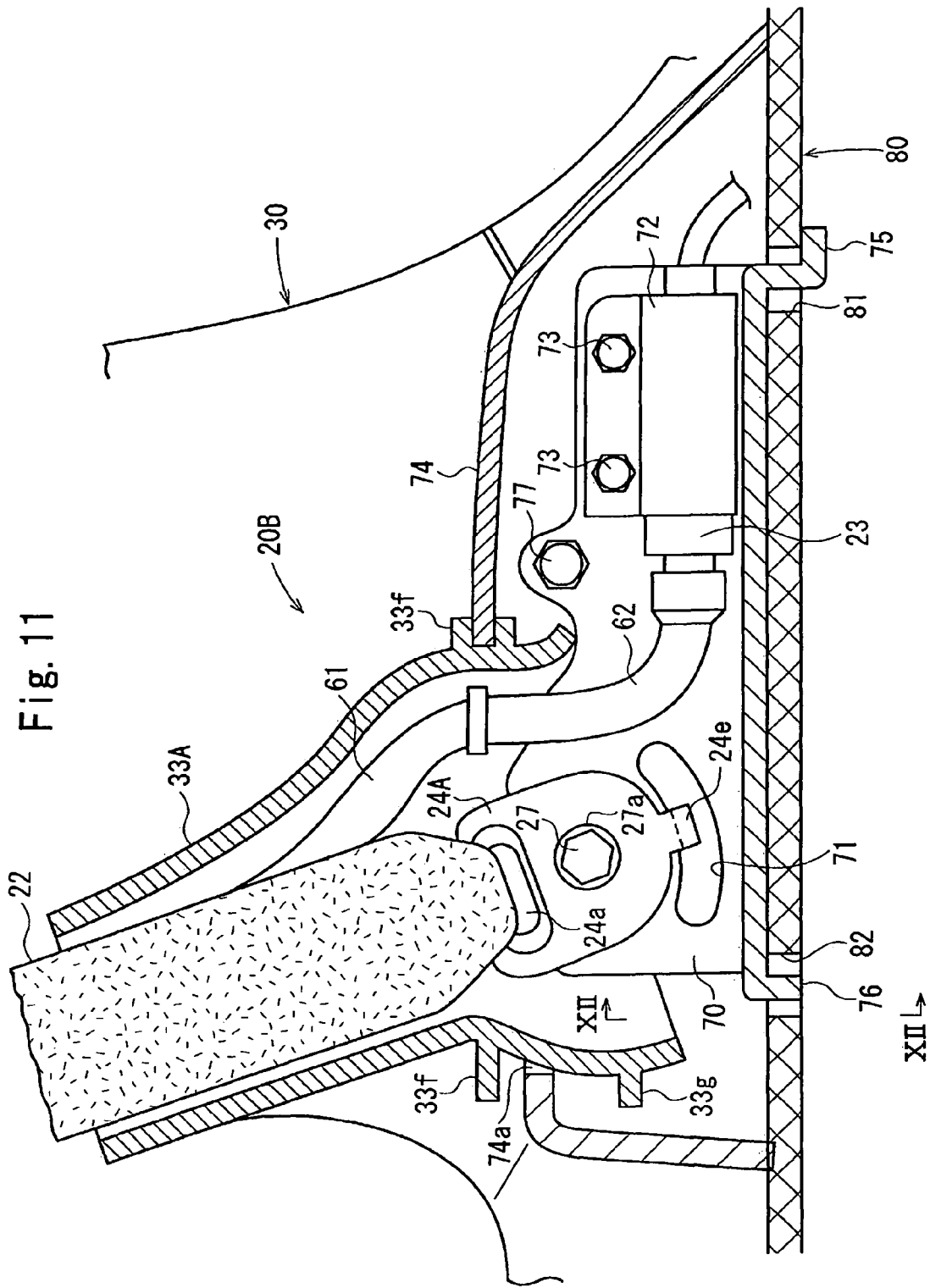
FIG. 11 is a vertical cross-section view in the vehicle fore-and-aft direction of the vicinity of an occupant restraint apparatus according to an embodiment different from the above embodiments.
Figure 12:
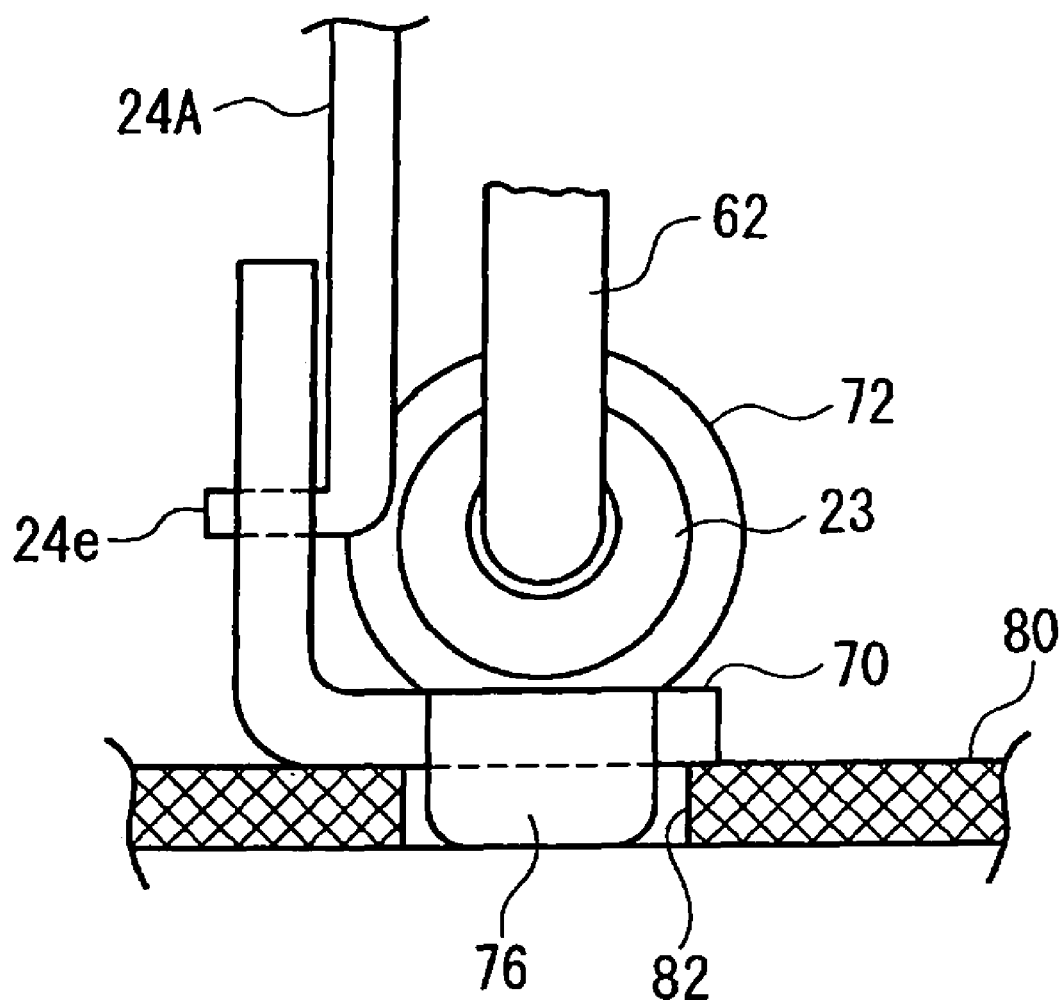
FIG. 12 is a cross-section view taken along lines XII-XII of FIG. 11.

FIG. 11 is a vertical cross-section view in the vehicle fore-and-aft direction of the vicinity of an occupant restraint apparatus according to a further different embodiment, and FIG. 12 is a cross-section view taken along lines XII-XII of FIG. 11.

The occupant restraint apparatus 20B of these FIGS. 11 and 12 is arranged in a manner such that a bracket 70 is mounted on a vehicle body floor 80, and an anchor 24A and an inflator 23 are attached to the bracket 70. Incidentally, also in this embodiment, the anchor 24A is attached by an attachment bolt 27 so as to be pivotable with respect to the bracket 70, and the pivoting range of the anchor 24A is restricted by a lug portion 24e and a slot 71.

In this embodiment, the inflator 23 is attached to the bracket 70 via an inflator holding hardware 72 and a pair of bolts 73. A lap bag 22 is connected to the inflator 23 via a gas introduction port 61 and a pipe 62.

A B-pillar cover 74 covers the bracket 70 (and the inflator 23, gas introduction port 61, pipe 62 and anchor 24A). The lap bag 22 is inserted through an opening 74a on the top face side of the B-pillar cover 74. A portion around the top end of the lap bag 22 is covered by a belt cover 33A. The belt cover 33A is connected to the B-pillar cover 74, also in this embodiment, so as to be pivotable in a fore-and-aft direction. The configuration of the belt cover 33A and its structure for connecting with the B-pillar cover 74 are the same as those of the embodiment of FIGS. 9 and 10 described above, and identical elements are indicated by identical reference characters.

Note that the bracket 70 is provided at its rear end with a hook portion 75 having a crank-shaped cross section, and at its front end with a lug portion 76. The hook portion 75 is retained in an opening 81 of the floor 80 and the lug portion 76 is retained in an opening 82 of the floor 80; thereby the bracket 70 is positioned. The bracket 70 is fixed to a B-pillar 30 using a bolt 77.

Also in this occupant restraint apparatus 20B, since the whole of gas supply members from the inflator 23 to the tip side of the lap bag 22 via the pipe 62 and gas introduction port 61 are covered by the covers 74 and 33A, good protection characteristics for these gas supply members are therefore ensured. In addition, since these gas supply members and also the anchor 24 and bracket 70 are not exposed in the vehicle cabin, the appearance of the interior of the vehicle cabin is good.

Additionally, also in this embodiment, when the tip side of the lap bag 22 is pivoted in a vehicle fore-and-aft direction due to fore-and-aft shifting of the seat, forward leaning of the occupant, or the like, the anchor 24A and the belt cover 33A are also pivoted in accordance therewith, and thereby twisting, rubbing, or the like arising in a top end portion, specifically at the portion close to the opening 24a are lessened. As a result, strength, abrasion resistance, and the like required for the lap bag 22 are relaxed.

It should be noted that although the bracket 70 is attached to the vehicle body in this embodiment it may be attached to a seat.

Although the above embodiments indicate examples of the present invention applied to the occupant restraint apparatus for a driver's seat, the present invention is applicable, as a matter of course, to an occupant restraint apparatus for any other passenger's seat.

Although the present invention has been described in relation to specified embodiments thereof, it is obvious to those skilled in the art that the invention may be practiced in various other forms not departing from the spirit and scope thereof.

It should be noted that this patent application is based on the patent application in Japan applied on Dec. 16, 2005 (Japanese Patent Application No. 2005-363691) and is assisted by reference to the whole thereof.

The invention claimed is:

1. An occupant restraint apparatus, comprising:
an anchor adapted to be fixed to a vehicle body;
a lap belt having a tip side fixed to the anchor, and an inflatable portion formed at the tip side;
an inflator for introducing gas from the tip side to inflate the inflatable portion; and
a cover including a first masking portion for covering the anchor, and a second masking portion formed separately from the first masking portion and attached to the first masking portion for covering at least the tip side of the lap belt,
wherein said first masking portion includes an opening with a peripheral portion at an upper side, and said second masking portion includes two flanges at a lower side, the peripheral portion being retained by the two flanges,
wherein the two flanges define a space therebetween, the space becoming larger toward a front side of the cover so that the second masking portion is pivoted in a fore-and-aft direction together with the anchor.

2. The occupant restraint apparatus according to claim 1, wherein the second masking portion of the cover is configured so as to be opened by being torn when the inflatable portion is inflated.

3. The occupant restraint apparatus according to claim 2, wherein the second masking portion has a tear line, and is opened by being torn along the tear line when the inflatable portion is inflated.

4. The occupant restraint apparatus according to claim 1, wherein the tip side of the lap belt is attached to an anchor attachment portion of the vehicle body via the anchor.

5. The occupant restraint apparatus according to claim 4, wherein the inflator is fixed to the anchor.

6. The occupant restraint apparatus according to claim 1, wherein the tip side of the lap belt is attached to an anchor attachment portion of a seat via the anchor.

7. The occupant restraint apparatus according to claim 6, wherein the inflator is fixed to the anchor.

8. The occupant restraint apparatus according to claim 1, wherein the second masking portion is pivotable in a fore-and-aft direction with respect to the first masking portion.

9. The occupant restraint apparatus according to claim 1, wherein the second masking portion of the cover is configured so as to hold the tip side of the lap belt in an attitude of being extended substantially upward in a state when the lap belt is not routed to a side of an occupant.

10. The occupant restraint apparatus according to claim 1, wherein the cover is made of plastic.

11. The occupant restraint apparatus according to claim 1, further comprising an anchor attachment portion fixed to the vehicle, said anchor being pivotally fixed to the anchor attachment portion.

12. The occupant restraint apparatus according to claim 11, wherein said anchor attachment portion includes a slot, and said anchor includes a lug portion protruding from the anchor and engaging the slot so that a pivotal range of the anchor is defined by the lug portion and the slot.

13. The occupant restraint apparatus according to claim 12, wherein said inflator is fixed to the anchor.

14. The occupant restraint apparatus according to claim 12, wherein said inflator is fixed to the anchor attachment portion.

* * * * *